July 15, 1952      M. ZITAROSA      2,603,517
BUMPER
Filed April 26, 1947
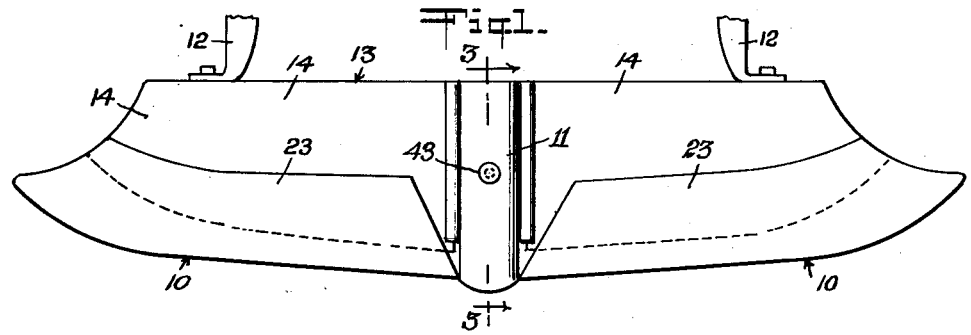
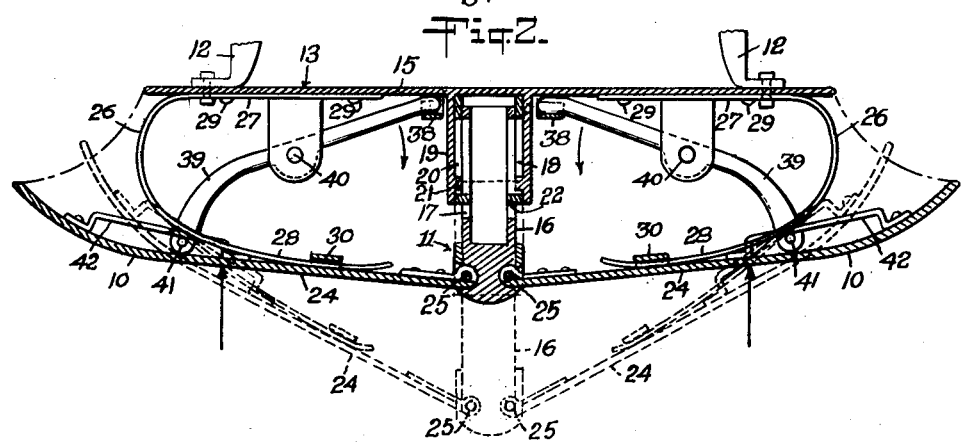
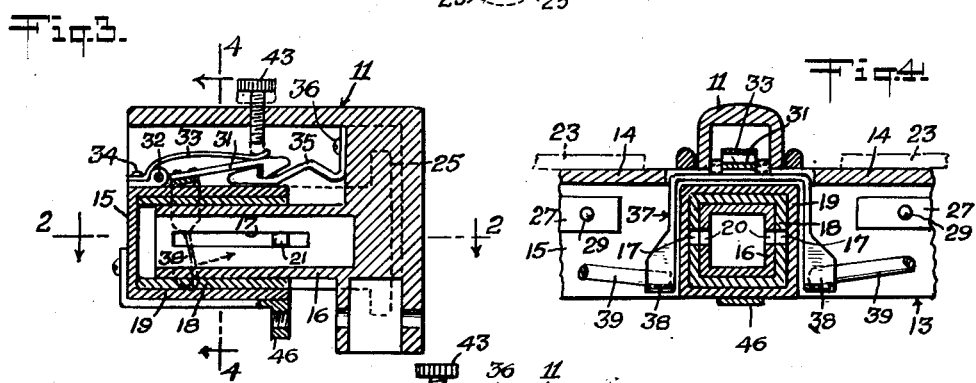
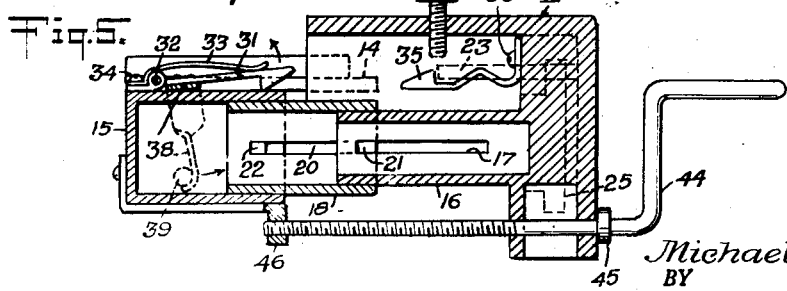
INVENTOR.
*Michael Zitarosa*
BY
*Munn, Liddy & Glaccum*
*Attorneys*

Patented July 15, 1952

2,603,517

UNITED STATES PATENT OFFICE 2,603,517

BUMPER

Michael Zitarosa, New York, N. Y.

Application April 26, 1947, Serial No. 744,237

5 Claims. (Cl. 293—89)

This invention relates to a bumper which may be used advantageously on an automobile or other vehicle.

The principal object of the present invention is the provision of an improved bumper of the indicated character which will minimize or avert damage to vehicles when they collide with each other, reduce shock to the occupants of the vehicles, and help to avoid interlocking of the bumper of one vehicle with the bumper or other parts of another vehicle.

With the foregoing, other objects of the invention will appear when the following specification is read in conjunction with the accompanying drawings, in which:

Fig. 1 is a top plan view of a bumper constructed in accordance with the present invention.

Fig. 2 is a horizontal sectional view through the bumper, the section being taken on the line 2—2 of Fig. 3, the bumper section being shown in full lines in their normal guarding positions and also shown in dotted lines in their deflecting positions.

Fig. 3 is a sectional view taken on the line 3—3 of Fig. 1.

Fig. 4 is a fragmentary sectional view taken on the line 4—4 of Fig. 3.

Fig. 5 is a view similar to Fig. 3 but showing the bumper sections released and being retracted by the use of a suitable tool.

The bumper as shown in the drawing comprises similar left and right sections 10 and a central section or part 11, all of which are mounted on and movable with respect to a structure integral with or as a separate part fixedly secured to the horns 12 of the frame of a vehicle chassis, and hereinafter referred to as the frame section 13. Primarily, the bumper is intended for automobiles, but it may be applied to other vehicles.

The frame section 13 is arranged transversely of the longitudinal axis of the vehicle. It is of inverted L shape in vertical section providing a horizontal flat top plate 14 and a vertical plate 15.

The central part 11 is of hollow construction and formed integral therewith is a tubular member 16 having longitudinal slots 17 in the opposite side walls thereof. The member 16 is rectangular in cross-section and extends rearwardly. The member 16 telescopes into an intermediate tubular member 18 which in turn telescopes into a tubular member 19 integral with or welded to the wall 15 of the frame section 13. The member 18 has longitudinal slots 20 in the opposite side walls thereof. The member 18 has lateral stop lugs 21 disposed in the slots 17 respectively. The member 19 has lateral stop lugs 22 disposed in the slots 20 respectively. It will be understood that the central part 11 is mounted on the frame section 13 for forward and rearward sliding movement with respect thereto by telescopic means consisting of the members 16, 18 and 19. The lugs 21 and 22 limit the forward movement of the part 11.

Each of the bumper sections 10 is of inverted L shape in cross section providing a top flange 23 and a vertical flange 24. The flange 23 rides on the plate 14 of the frame section 13. The outer end of each bumper section 10 is preferably rounded rearwardly as shown. The inner end of each section 10 is connected with the part 11 by a vertical pivot pin 25 whereby the sections 10 moved with the part 11 and also may have pivotal movement with respect thereto from normal retracted guarding positions into abnormal oblique deflecting positions. In Fig. 2 the bumper sections 10 are shown in full lines in their normal positions and shown in dotted lines in their abnormal positions.

Each bumper section 10 is under the influence of a forceful resilient power means consisting of a substantially U shape spring 26 having portions 27 and 28 joined by a bight. The portion 27 is rigidly secured to the plate 15, as at 29. The portion 28 extends loosely between the flange 24 and a guide 30 secured to said flange, as shown in Fig. 2. The springs 26 constantly tend to force the bumper sections forwardly governed by their pivotal connections 25 into deflecting positions to oppose the force of an impact on either one of said sections 10.

In order to releasably retain the bumper sections 10 in the retracted normal positions through the intervention of the central part 11, there is provided a beveled latch member 31 pivotally connected, as at 32, with the member 19 at the top thereof between the cut out in the plate 14. The latch member 31 is under the influence of a leaf spring 33 having one end secured as at 34 to the connection 32, the other end of the spring bearing on the latch member to constantly urge it into a latching position, as shown in Fig. 3. The latch member 31 is engageable with a beveled lug 35 secured as at 36 to the part 11 on the inside thereof. The lug 35 engages the latch member 31 by the rearward sliding movement of the part 11 for the stated purpose.

In order to disengage the latch member 31 from the lug 35, when either one of the bumper sections 10 is subjected to the force of an impact resulting from a collision, so that the sections may be forcefully moved to meet the opposing force, there is provided means presently to be described. An inverted U shape trip 37 is secured to the latch member 31. The trip 37 provides members 38 disposed at opposite sides of the tubular member 19. A lever 39 is fulcrumed as at 40 on the plate 15 to cooperate with each of the bumper sections 10. One end of the lever is engaged with a member 38 and the other end having a transverse pin 41 is encountered by the section 10. U shape guide members 42 secured to the bumper sections 10 cooperate with the pins 41 to retract the levers 39 to their functioning positions. Each bumper section 10 acting on its lever 39 causes the latter to operate the trip 37 which in turn moves the latch member 31 out of engagement with the lug 35. Immediately afterward the springs 26 forcefully move the bumper sections 10 out of their normal guarding positions into their deflecting positions. In doing so the sections are controlled by the forward movement of the part 11 and the flanges 23 riding on the plate 14.

If desired to prevent the release of the bumper sections 10 from their normal guarding positions, use is made of means in the form of a set screw 43 carried by the part 11. This screw may be adjusted to hold the latch member 31 in latching engagement with the lug 35 as indicated in dotted lines in Fig. 3.

Use is made of an accessory in the nature of a screw threaded crank 44 with a collar 45 to force the bumper sections 10 back into their normal guarding position. For this purpose the central part 11 has holes therein to loosely receive the crank. The plate 15 has a tapped lug 46 secured thereto which receives the threaded portion of the crank while the collar 45 bears on the part 11. By manipulating the crank, the part 11 is forced rearwardly and together with the members 42 acting on the pins 41 causing the bumper sections to move into their normal guarding positions.

From the foregoing, it will be understood there is described a bumper construction which is designed and adapted to accomplish the objects and advantages mentioned.

I claim:

1. A vehicle bumper comprising a fixed frame section, bumper sections, means on said frame section with which said bumper sections have their adjacent inner ends pivotally connected for movement out of their normal guarding positions into deflecting positions, said bumper sections being supported by said frame section so as to ride thereon upon pivotal movement of the bumper sections, mechanism to retain the bumper sections in their guarding positions subject to the force of an impact on either one of said bumper sections which causes said mechanism to release the bumper sections, means which forcefully moves said bumper sections into their deflecting positions when released as aforesaid, and selectively operable means which cooperates with said mechanism to prevent the release of said bumper sections.

2. A vehicle bumper including a fixed frame section, a central part mounted on said frame section for forward and rearward movement, bumper sections having their inner ends connected with said central part for movement out of their normal guarding positions into deflecting positions in response to the forward movement of said central part, mechanism cooperating with said central part to retain the bumper sections in their guarding positions subject to the force of an impact on either one of said bumper sections which causes said mechanism to release said central part, said mechanism comprising a latch, and lever means acted on by each of said bumper sections to actuate the latch to release said central part for movement enabling the bumper sections to be moved into their deflecting positions; spring means acting on said bumper sections which forcefully move them into their deflecting position when released as aforesaid, and selectively operable means to prevent the latch from being actuated so that the bumper sections cannot be moved out of their guarding positions.

3. A vehicle bumper including a fixed frame section, a central part mounted on said frame section for forward and rearward movement, bumper sections having their inner ends connected with said central part for movement out of their normal guarding positions into deflecting positions in response to the forward movement of said central part, mechanism cooperating with said central part to retain the bumper sections in their guarding positions subject to the force of an impact on either one of said sections which causes said mechanism to release said central part, said mechanism comprising a latch, and lever means acted on by each of said bumper sections to actuate the latch to release said central part for movement enabling said bumper sections to be moved into their deflecting positions; and spring means acting on said bumper sections which forcefully moves said sections into their deflecting positions when released as aforesaid.

4. A vehicle bumper comprising a frame section adapted to be fixedly secured to the vehicle, a central part, hollow telescopic members between the frame section and the central part mounting the latter for forward and rearward movement, bumper sections having their inner ends pivotally connected with said central part for movement out of their normal guarding positions into deflecting positions in response to the forward movement of the central part, said bumper sections being supported by the frame section so as to ride thereon upon pivotal movement of the bumper sections, mechanism cooperating with said central part to retain the bumper sections in their guarding positions subject to the force of an impact on either one of said bumper sections which causes said mechanism to release said central part, and spring means interposed between said frame section and said bumper sections which forcefully moves said sections into their deflecting positions when released as aforesaid.

5. A vehicle bumper comprising a frame section adapted to be fixedly secured to the vehicle, a central part, telescopic members between the frame section and the central part mounting the latter for forward and rearward movement, bumper sections loosely supported by the frame section and having their inner adjacent ends pivotally connected with said central part for movement out of their normal guarding positions into deflecting positions, a latch to releasably retain said central part retracted, levers fulcrumed on said frame section connected with said latch and engaged with said bumper sections to operate the latch to release the central part for forward movement, when either one of said bumper sections is subjected to the force of an impact, and spring means interposed between said frame section and the bumper sections which forcefully moves said bumper sections into their deflecting positions when released as aforesaid.

MICHAEL ZITAROSA.

REFERENCES CITED

The following references are of record in the file of this patent:

UNITED STATES PATENTS

| Number | Name | Date |
|---|---|---|
| 492,423 | Nagele | Feb. 28, 1893 |
| 504,485 | Barnes | Sept. 5, 1893 |
| 761,612 | Sandifer | May 31, 1904 |
| 1,248,366 | Masuda | Nov. 27, 1917 |
| 1,477,275 | McCloskey | Dec. 11, 1923 |
| 1,646,055 | Ebaugh | Oct. 18, 1927 |
| 1,855,977 | Llobet | Apr. 26, 1932 |
| 1,901,227 | Cossalter | Mar. 14, 1933 |
| 2,466,265 | Noonan | Apr. 5, 1949 |

FOREIGN PATENTS

| Number | Country | Date |
|---|---|---|
| 7,970 | Great Britain | Apr. 2, 1903 |
| 434,957 | Great Britain | Sept. 13, 1935 |